United States Patent Office 2,826,553
Patented Mar. 11, 1958

2,826,553

CALCIUM-STRONTIUM PYRO-PHOSPHATE PHOSPHORS

Keith H. Butler, Marblehead, Mass., assignor to Sylvania Electric Products Inc., Salem, Mass., a corporation of Massachusetts No Drawing. Application April 10, 1951
Serial No. 220,356

5 Claims. (Cl. 252—301.4)

This invention relates to phosphors for excitation by ultraviolet radiation, cathode rays, X-rays and the like, and particularly to phosphors for fluorescent lamps.

In my co-pending application Serial No. 213,803, filed March 3, 1951, now Patent 2,786,034, issued March 19, 1957, I describe a tin-activated calcium-strontium phosphor, in which the proportions of calcium-plus-strontium to the phosphate radical are somewhat less than stoichiometric for the orthophosphate.

Such a phosphor gives a reddish emission. I have found that reducing the calcium-strontium content to the pyrophosphate proportions will almost completely suppress the red emission and will cause the emission to be almost entirely blue. The strontium pyrophosphate will fluoresce strongly blue, in response to excitation by the 2537 Angstrom mercury wavelength, and this blue can be appreciably increased in intensity by the replacement of a small amount of the strontium by calcium. This effect is of an unexpected nature, because calcium pyrophosphate itself will not fluoresce appreciably in response to the 2537 Angstrom radiation, and hence the replacement of all the strontium will merely result in a substantially non-fluorescent substance.

Useful phosphors can, however, be obtained even when the mol ratio of calcium to strontium somewhat exceeds two to one, but the best results are obtained with relatively small amounts of calcium, and the replacement of even a very small quantity of strontium by calcium enhances the fluorescence of the phosphor.

In these calcium strontium pyrophosphate phosphors activated by tin, at least part of the tin must be present in the stannous state if fluorescence is to be obtained. If the mixture is fired in air in open silica vessels, the resulting powder is white but non-fluorescent. If this powder is then refired in a controlled reducing atmosphere the resulting product is fluorescent. I have found that an atmosphere, composed mainly of an inert gas such as nitrogen or argon, and containing a small percentage of a reducing gas such as hydrogen or carbon mono-oxide is very effective as a firing medium. Other inert gases and other reducing gases may however be substituted.

In carrying out this second firing, the amount of reducing gas in the mixture must be adjusted to suit the particular composition being fired and also the firing temperature employed. For example, with hydrogen-nitrogen mixtures, if the hydrogen content of the gas mixture is too high, the phosphor becomes discolored somewhat gray and the output is considerably diminished. This gray discoloration is thought to be due to the reduction of a part of the tin content to metallic tin. This tendency to development of a gray discoloration is more marked if the temperature of firing is high or if the tin content is high.

In the preparation of these phosphors, I prefer to use secondary calcium phosphate and secondary strontium phosphate combined with either stannous oxide or stannic oxide as the source of the tin. However, it is possible to use an ammonium phosphate combined with a calcium or strontium salt, which breaks down on heating to form the oxide, to form the matrix material and to introduce the tin as a similar heat-decomposable salt, or as a phosphate, or as a halide. Carbonates, oxalates, acetates, and nitrates are examples of suitable salts decomposable by heat.

The correct proportions of the various raw materials may be mixed by ballmilling dry, by ballmilling in water or acetone, or by hammermilling or by other suitable methods. After the mixture is prepared, it is fired in air at a temperature which is preferably between 1900° F. and 2200° F., but not limited to that range, to eliminate combined water and to form the pyrophosphate matrix containing tin in solid solution in the stannic form. The resultant powder is substantially non-fluorescent.

After this prefiring operation, I mortar grind or hammermill the powder to break down any sintered aggregates and then refire in the controlled ambient atmosphere. Although I prefer this method of firing, it is also possible to obtain phosphors of substantially equal quality by omitting the prefiring operation and firing directly in the controlled atmosphere. When using this single firing method, the time must be somewhat increased to insure both formation of the matrix and the reduction of tin to the stannous state.

In Table 1 below, the effect of small substitutions of calcium for strontium is shown in phosphors containing 0.01 gram-atom of tin for each 2.00 gram-atoms calcium plus strontium and 2.00 gram moles of phosphate. These combine to form 1.00 gram mole of the calcium strontium pyrophosphate. The output of the phosphors is expressed as percentage of the reading obtained with an arbitrary calcium halo phosphate standard when the powders are excited by resonance radiation from a low pressure mercury arc lamp. The output is read with a photovoltaic cell using a Wratten filter (tricolor blue) in front of the cell. It will be noticed that the phosphor containing the smallest amount of calcium has the highest output and that all powders are substantially white. In the tables below the "color" refers to the appearance of the unexcited phosphors when viewed by ordinary light.

TABLE 1

*Effect of temperature and gas composition on output of calcium strontium pyrophosphates containing 0.01 gram-atom of tin*

| Composition in gram-atoms or moles, before firing | | | | Blue output of phosphor and color, 2,000° F. firing | | |
|---|---|---|---|---|---|---|
| Ca | Sr | Sn | $PO_4$ | 0.56% $H_2$ | 1.4% $H_2$ | 0.56% $H_2$ |
| 0.10 | 1.90 | 0.01 | 2.00 | 265 white | 300 white | 315 white. |
| 0.20 | 1.80 | 0.01 | 2.00 | 245 white | 285 white | 295 white. |
| 0.50 | 1.50 | 0.01 | 2.00 | 260 white | 250 white | 275 white. |

Table 2 below shows the effect of tin concentration on a phosphor in which an appreciable amount of strontium has been replaced by calcium. It will be noticed that powders discolored gray are obtained when the hydrogen concentration in the ambient atmosphere is allowed to rise to 2.8%. It is also apparent that the tin content has an optimum value in the neighborhood of 0.02 gram-atom. If it is allowed to rise above this, the output falls off and the powders tend to become gray even with low hydrogen concentrations.

TABLE 2

*Effect of temperature and gas composition on output of calcium strontium pyrophosphates*

| Composition in gram-atoms or moles, before firing | | | | Blue output of phosphor and color, 2,000° F. firing | | | |
|---|---|---|---|---|---|---|---|
| Ca | Sr | Sn | PO$_4$ | 0.28% H$_2$ | 0.56% H$_2$ | 1.4% H$_2$ | 2.8% H$_2$ |
| 0.50 | 1.50 | 0.01 | 2.00 | ------------ | 260 white | 250 white | 165 sl. gray. |
| 0.50 | 1.50 | 0.02 | 2.00 | 310 white | 320 white | 310 white | 255 sl. gray. |
| 0.50 | 1.50 | 0.04 | 2.00 | ------------ | 265 white | 280 white | 135 sl. gray. |
| 0.50 | 1.50 | 0.08 | 2.00 | ------------ | 105 sl. gray | 100 sl. gray | 110 sl. gray. |

Table 3 below shows the effect of varying the calcium to strontium ratio over a much wider range. Here substitution of 0.20 gram-atom of calcium for strontium leads to maximum output and to powders least sensitive to the effect of gas composition. However, useful phosphors are obtained even when the strontium content is as low as 0.20 gram-atom, with the calcium content being 1.80 gram-atoms.

TABLE 3

*Effect of gas composition on output of calcium strontium pyrophosphate containing 0.02 gram-atom of tin*

| Composition in gram-atoms or moles, before firing | | | | Blue output of phosphors and color, 2,000° F. firing | | |
|---|---|---|---|---|---|---|
| Ca | Sr | Sn | PO$_4$ | 0.56% H$_2$ | 1.4% H$_2$ | 2.8% H$_2$ |
| 0.00 | 2.00 | 0.02 | 2.00 | 210 white | 190 sl. gray | 70 gray. |
| 0.20 | 1.80 | 0.02 | 2.00 | 320 white | 315 white | 285 white. |
| 0.50 | 1.50 | 0.02 | 2.00 | 300 white | 290 white | 205 trace gray. |
| 1.50 | 0.50 | 0.02 | 2.00 | 200 white | 175 white | 170 white. |
| 1.60 | 0.40 | 0.02 | 2.00 | 190 white | 205 white | 170 trace gray. |
| 1.70 | 0.30 | 0.02 | 2.00 | 150 white | 180 white | 70 gray. |
| 1.80 | 0.20 | 0.02 | 2.00 | 115 white | 140 white | 0 gray. |

Table 4 shows the effect of various firing conditions and tin contents on strontium pyrophosphate. It will be seen that white powders of good blue output result from the use of low tin content and low hydrogen concentrations, but that increasing tin content leads to powders which are more sensitive to the amount of hydrogen in the gas mixture.

TABLE 4

*Effect of gas composition and tin content on output of of strontium pyrophosphate*

| Composition in gram-Atoms or Moles, Before Before Firing | | | Blue Output and Phosphors and color, 2,000° F. firing | | | |
|---|---|---|---|---|---|---|
| Sr | PO$_4$ | Sn | 0.28% H$_2$ | 0.56% H$_2$ | 1.4% H$_2$ | 2.8% H$_2$ |
| 2.00 | 2.00 | 0.005 | 20 white | 110 white | 115 white | 70 tr. gray. |
| 2.00 | 2.00 | 0.02 | 110 white | 210 white | 190 sl. gray | 70 tr. gray. |
| 2.00 | 2.00 | 0.05 | 115 sl. gray | 115 sl. gray | 120 gray | 175 gray. |

Small deviations from the stoichiometric ratio of two gram-atoms of the combined metal ions, calcium and strontium, to each two gram-moles of phosphate radical in the unfired mixture have little effect on the output of the powders. However, an excess of phosphate tends to give powders which sinter to a rather hard mass, while powders with the stoichiometric amount of phosphate or less tend to be soft and friable.

The mole composition should not vary much more than 10% from stoichiometric for satisfactory phosphors; in other words, the mole ratio of calcium-plus-strontium to the phosphate radical should be between 1.9 to 2.0 and 2.1 to 2.0.

Use of a slight excess of calcium increases the tendency toward gray discoloration, while use of a slight excess of phosphate reduces this tendency and allows a higher concentration of reducing gas to be used. The tin content may be between about 0.002 and about 0.08 gram-atom per two moles of phosphate radical.

As one example of my invention, I will describe the preparation of a phosphor containing 0.50 gram-atom of calcium, 1.50 gram-atoms of strontium and 0.02 gram-atom of tin to each 2.00 gram moles of phosphate.

The following proportions of reagent grade chemicals were wet milled in a quart ball mill using acetone as a suspending medium; after which the mixture was filtered, dried, and lightly crushed.

| | Moles | Grams |
|---|---|---|
| CaHPO$_4$ | 0.125 | 17.00 |
| SrHPO$_4$ | 0.375 | 68.60 |
| SnO | 0.005 | 0.67 |

The mixture was fired in an open silica tray for 1½ hours at 2000° F. After cooling, the resultant white soft non-fluorescent powder was crushed in a mortar and then placed in porcelain boats for refiring in a controlled atmosphere.

The porcelain boat, containing the prefired powder, was placed inside a large silica tube and pushed to the closed end of this tube, the closure of which was effected by fusion. The open end of the tube was then sealed by a rubber stopper which had two small holes—one of them serving as a vent. A small diameter silica tube, extending over the boat to within ½ inch of the closed end of the large silica tube, was inserted through the other hole in the rubber stopper. The gas mixture, comprising 1.4% electrolytic hydrogen and 98.6% oxygen-free nitrogen, entered through this tube, flowed back through the outer tube, and then out through the vent opening in the rubber stopper. After inserting the boat and sealing the silica tube with the rubber stopper, the assembly was flushed with the gas mixture for 10 minutes before firing started. The closed end of the silica tube, containing the porcelain boat, was inserted through an opening in the wall of a furnace heated to 2000° F., so that the whole length containing the boat was uniformly heated. After ½ hour in the furnace the silica tube was withdrawn and cooled to about 500° F. before opening to remove the porcelain boat. The gas flow was maintained at a fixed rate during flushing, firing, and cooling. The fluorescent powder fired in this way had photometer readings as follows:

| | |
|---|---|
| Viscor | 29 |
| Red | 3 |
| Green | 35 |
| Blue | 300 |

The light emitted by the phosphors is a rather deep blue and gives a blue fluorescent lamp with pleasing appearance and excellent efficiency. The phosphors can also be excited efficiently by cathode rays with emission of blue light, with the decay time after excitation stops being low.

What I claim is:

1. A tin-activated calcium strontium pyrophosphate phosphor in which a substantial part of the tin is in the stannous state having a gram-atom ratio of calcium to strontium of between zero and 9.

2. The phosphor of claim 1 in which the tin content is between about 0.002 and about .08 gram-atom per two moles of phosphate radical.

3. The phosphor of claim 1 in which the tin content is about 0.02 gram-atom per two moles of phosphate radical.

4. A tin-activated phosphor of a pyrophosphate of a substance selected from the following group consisting of strontium and calcium plus strontium, in which the mole ratio of calcium to strontium is between zero and 9 and in which a substantial part of the tin is in the stannous state.

5. A tin-activated pyrophosphate phosphor of a substance selected from the group consisting of strontium and calcium-strontium, in which the gram-atom ratio of calcium to strontium when calcium is present, is less than about 9, and in which the tin content is between about 0.002 and about 0.08 gram-atom per mole of the pyrophosphate, and in which a substantial part of the tin is in the stannous state.

References Cited in the file of this patent

UNITED STATES PATENTS

| | | |
|---|---|---|
| 2,270,124 | Huniger | Jan. 13, 1942 |

FOREIGN PATENTS

| | | |
|---|---|---|
| 578,272 | Great Britain | June 21, 1946 |